(12) United States Patent
Huang et al.

(10) Patent No.: US 12,444,444 B2
(45) Date of Patent: Oct. 14, 2025

(54) MULTI-WRITE READ-ONLY MEMORY ARRAY

(71) Applicant: YIELD MICROELECTRONICS CORP., Hsin-Chu County (TW)

(72) Inventors: Yu-Ting Huang, Hsin-Chu County (TW); Chi-Pei Wu, Hsin-Chu County (TW)

(73) Assignee: Yield Microelectronics Corp., Hsin-chu County (TW)

( * ) Notice: Subject to any disclaimer, the term of this patent is extended or adjusted under 35 U.S.C. 154(b) by 146 days.

(21) Appl. No.: 18/529,115

(22) Filed: Dec. 5, 2023

(65) Prior Publication Data
US 2025/0111868 A1    Apr. 3, 2025

(30) Foreign Application Priority Data
Oct. 3, 2023  (TW) ................. 112137822

(51) Int. Cl.
*G11C 16/04* (2006.01)
*G11C 5/06* (2006.01)
*G11C 16/14* (2006.01)
(52) U.S. Cl.
CPC ............ *G11C 5/063* (2013.01); *G11C 16/14* (2013.01); *G11C 16/0416* (2013.01)

(58) Field of Classification Search
CPC ............ H01L 27/115; H01L 27/11521; G11C 16/0416
See application file for complete search history.

(56) References Cited

U.S. PATENT DOCUMENTS 6,841,447 B1 * 1/2005 Logie ............... H10B 69/00
438/296
2005/0270850 A1 * 12/2005 Wang ............. G11C 16/3477
365/185.28

* cited by examiner

*Primary Examiner* — Jason Lappas
(74) *Attorney, Agent, or Firm* — Rosenberg, Klein & Lee

(57) ABSTRACT

A multi-write read-only memory array includes word common-source lines, bit lines, and sub-memory arrays. The word common-source lines include a first word common-source line and a second word common-source line. The bit lines include a first bit line and a second bit line. Each sub-memory array includes a first memory cell coupled to the first word common-source line and the first bit line, a second memory cell coupled to the first word common-source line and the second bit line, a third memory cell coupled to the second word common-source line and the second bit line, and a fourth memory cell coupled to the second word common-source line and the first bit line.

18 Claims, 6 Drawing Sheets

MULTI-WRITE READ-ONLY MEMORY ARRAY

BACKGROUND OF THE INVENTION

This application claims priority for the TW patent application no. 112137822 filed on 3 Oct. 2023, the content of which is incorporated by reference in its entirely.

FIELD OF THE INVENTION

The present invention relates to a memory array, particularly to a multi-write read-only memory array.

DESCRIPTION OF THE RELATED ART

The Complementary Metal Oxide Semiconductor (CMOS) technology has been developed as a commonly used process for fabricating Application Specific Integrated Circuits (ASIC). Nowadays, as the computer information products are blooming, flash memories and Electrically Erasable Programmable Read Only Memory (EEPROM) have been widely used in electronic products since the data stored within will not volatilize but can be erased and programmed electrically. In addition, the data will not disappear even after the power is turned off.

Non-volatile memories are programmable and are able to adjust gate voltages of their transistors by storing charges, or to preserve the original gate voltages of transistors by not storing charges. When regarding to erase a non-volatile memory, the charges stored in the non-volatile memory are removed to resume the initial state of the memory, and return to its original gate voltages of the transistors. When the non-volatile memory is programmed, its internal switches will be turned off or turned on. In order to program the non-volatile memory array, a certain voltage and current need to be applied, so that the corresponding switches can be turned on or off. In order to improve the stability, reliability, power consumption, storage density and read speed of the read-only memory, the area of the gate capacitor is usually larger. However, when the area of the gate capacitor becomes larger, the cost becomes higher. Thus, the read-only memory becomes less competitive in the market.

To overcome the abovementioned problems, the present invention provides a multi-write read-only memory array, so as to solve the afore-mentioned problems of the prior art.

SUMMARY OF THE INVENTION

The present invention provides a multi-write read-only memory array, which greatly reduces the area of a capacitor.

In an embodiment of the present invention, a multi-write read-only memory array is provided. The multi-write read-only memory array includes a plurality of word common-source lines, a plurality of bit lines, and a plurality of sub-memory arrays. The word common-source lines, arranged in parallel, include a first word common-source line and a second word common-source line. The bit lines are arranged in parallel. The bit lines perpendicular to the word common-source lines include a first bit line and a second bit line. Each sub-memory array is coupled to two word common-source lines and two bit lines. Each sub-memory array includes a first memory cell, a second memory cell, a third memory cell, and a fourth memory cell. The first memory cell is coupled to the first word common-source line and the first bit line. The second memory cell is coupled to the first word common-source line and the second bit line. The third memory cell is coupled to the second word common-source line and the second bit line. The fourth memory cell is coupled to the second word common-source line and the first bit line.

In an embodiment of the present invention, the first memory cell and the second memory cell are symmetric about the first word common-source line. The third memory cell and the fourth memory cell are symmetric about the second word common-source line. The second memory cell and the third memory cell are located between the first memory cell and the fourth memory cell.

In an embodiment of the present invention, the first memory cell, the second memory cell, the third memory cell, and the fourth memory cell are formed in a semiconductor region having a first conductivity type. The first memory cell, the second memory cell, the third memory cell, and the fourth memory cell commonly include a first gate dielectric block, a second gate dielectric block, a third gate dielectric block, a fourth gate dielectric block, a first conductive gate, a second conductive gate, a third conductive gate, a fourth conductive gate, a first heavily-doped area, a second heavily-doped area, a third heavily-doped area, a fourth heavily-doped area, and a fifth heavily-doped area. The first gate dielectric block, the second gate dielectric block, the third gate dielectric block, and the fourth gate dielectric block are respectively formed on the semiconductor region. The first conductive gate, the second conductive gate, the third conductive gate, and the fourth conductive gate are respectively formed on the first gate dielectric block, the second gate dielectric block, the third gate dielectric block, and the fourth gate dielectric block. The first heavily-doped area and the second heavily-doped area are formed in the semiconductor region, respectively formed on two opposite side of the semiconductor region, which is directly arranged under the first conductive gate, and respectively coupled to the first bit line and the first word common-source line. The first heavily-doped area and the second heavily-doped area have a second conductivity type opposite to the first conductivity type. The third heavily-doped area is formed in the semiconductor region. The second heavily-doped area and the third heavily-doped area are respectively formed on two opposite side of the semiconductor region, which is directly arranged under the second conductive gate. The third heavily-doped area is coupled to the second bit line. The third heavily-doped area has the second conductivity type. The fourth heavily-doped area is formed in the semiconductor region. The third heavily-doped area and the fourth heavily-doped area are respectively formed on two opposite side of the semiconductor region, which is directly arranged under the third conductive gate. The fourth heavily-doped area is coupled to the second word common-source line. The fourth heavily-doped area has the second conductivity type. The fifth heavily-doped area is formed in the semiconductor region. The fourth heavily-doped area and the fifth heavily-doped area are respectively formed on two opposite side of the semiconductor region, which is directly arranged under the fourth conductive gate. The fifth heavily-doped area is coupled to the first bit line. The fifth heavily-doped area has the second conductivity type.

In an embodiment of the present invention, the first conductivity type is a P type and the second conductivity type is an N type.

In an embodiment of the present invention, when the first memory cell is selected to perform a programming activity, the semiconductor region is coupled to a grounding voltage, the first bit line is coupled to a middle voltage or the grounding voltage, and the first word common-source line is coupled to the middle voltage or a high voltage. The high voltage is greater than the middle voltage and the middle voltage is greater than the grounding voltage.

In an embodiment of the present invention, when the first memory cell is not selected to perform a programming activity, the semiconductor region is coupled to a grounding voltage, the first bit line is electrically floating or coupled to a low voltage, and the first word common-source line is coupled to the grounding voltage. The low voltage is greater than the grounding voltage.

In an embodiment of the present invention, when the first memory cell is selected to perform an erasing activity, the semiconductor region is coupled to a grounding voltage, the first bit line is coupled to a high voltage, and the first word common-source line is coupled to the grounding voltage. The high voltage is greater than the grounding voltage.

In an embodiment of the present invention, when the first memory cell is not selected to perform an erasing activity, the semiconductor region is coupled to a grounding voltage, the first bit line is electrically floating, and the first word common-source line is coupled to a low voltage or a middle voltage. The middle voltage is greater than the low voltage and the low voltage greater than the grounding voltage.

In an embodiment of the present invention, when the first memory cell is selected to perform a reading activity, the semiconductor region and the first bit line are coupled to a grounding voltage and the first word common-source line is coupled to a low voltage. The low voltage is greater than the grounding voltage.

In an embodiment of the present invention, when the first memory cell is not selected to perform a reading activity, the semiconductor region, the first bit line, and the first word common-source line are coupled to a grounding voltage.

In an embodiment of the present invention, the first conductivity type is an N type and the second conductivity type is a P type.

In an embodiment of the present invention, when the first memory cell is selected to perform a programming activity, the semiconductor region is coupled to a high voltage, the first bit line is coupled to a middle voltage or the high voltage, and the first word common-source line is coupled to the middle voltage or a grounding voltage. The high voltage is greater than the middle voltage and the middle voltage is greater than the grounding voltage.

In an embodiment of the present invention, when the first memory cell is not selected to perform a programming activity, the semiconductor region is coupled to a high voltage, the first bit line is electrically floating or coupled to a middle voltage, and the first word common-source line is coupled to the high voltage. The high voltage is greater than the middle voltage.

In an embodiment of the present invention, when the first memory cell is selected to perform an erasing activity, the semiconductor region is coupled to a high voltage, the first bit line is coupled to a grounding voltage, and the first word common-source line is coupled to the high voltage. The high voltage is greater than the grounding voltage.

In an embodiment of the present invention, when the first memory cell is not selected to perform an erasing activity, the semiconductor region is coupled to a high voltage, the first bit line is electrically floating, and the first word common-source line is coupled to a middle voltage. The high voltage is greater than the middle voltage.

In an embodiment of the present invention, when the first memory cell is selected to perform a reading activity, the semiconductor region and the first bit line are coupled to a middle voltage and the first word common-source line is coupled to a low voltage. The middle voltage is greater than the low voltage.

In an embodiment of the present invention, when the first memory cell is not selected to perform a reading activity, the semiconductor region, the first bit line, and the first word common-source line are coupled to a middle voltage. The middle voltage is greater than the grounding voltage.

In an embodiment of the present invention, the semiconductor region is a semiconductor substrate or an epitaxial layer formed on a semiconductor substrate.

To sum up, the embodiments of the multi-write read-only memory array employs the drain of a field-effect transistor to provide a gate voltage to greatly reduce the area of a capacitor.

Below, the embodiments are described in detail in cooperation with the drawings to make easily understood the technical contents, characteristics and accomplishments of the present invention.

DETAILED DESCRIPTION OF THE INVENTION

Figure 1:
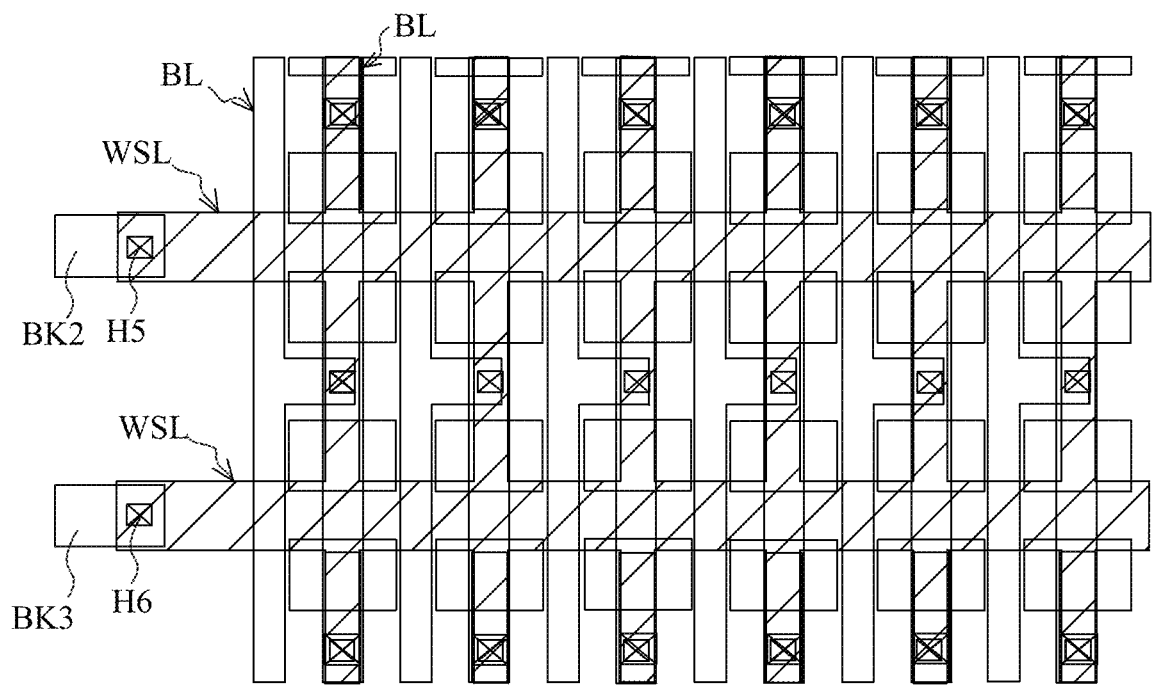
FIG. 1 is a schematic diagram illustrating the circuit layout of a multi-write read-only memory array according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to using different names. This disclosure does not intend to distinguish between components that differ in name but in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

In the following description, a multi-write read-only memory array will be provided, which employs the drain of a field-effect transistor to provide a gate voltage to greatly reduce the area of a capacitor.

Figure 2:
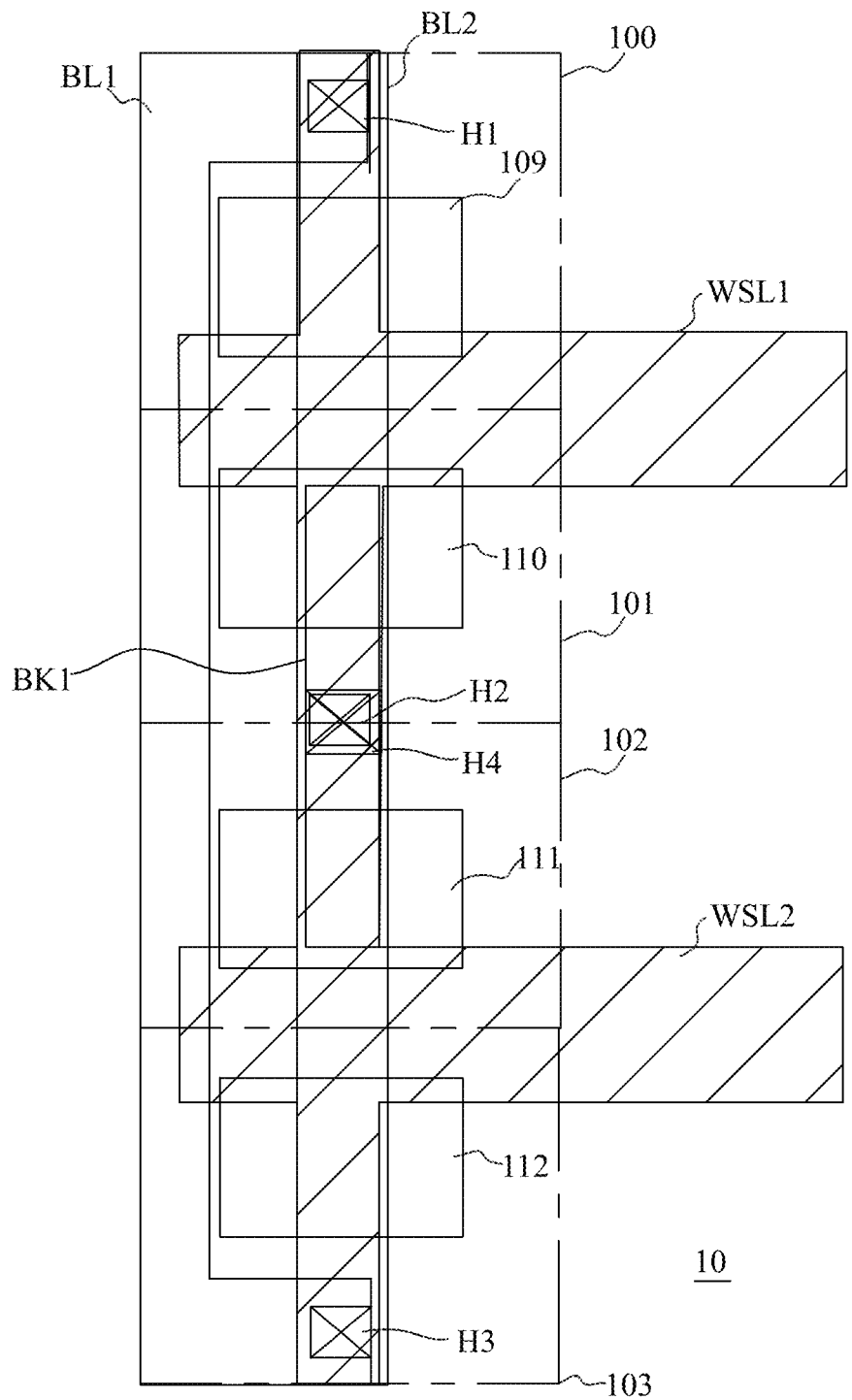
FIG. 2 is a schematic diagram illustrating the circuit layout of a sub-memory array according to an embodiment of the present invention.

FIG. 1 is a schematic diagram illustrating the circuit layout of a multi-write read-only memory array according to an embodiment of the present invention. FIG. 2 is a schematic diagram illustrating the circuit layout of a sub-memory array according to an embodiment of the present invention. Referring to FIG. 1 and FIG. 2, a multi-write read-only memory array 1 of the present invention is introduced as follows. The multi-write read-only memory array 1 includes a plurality of word common-source lines WSL arranged in parallel, a plurality of bit lines BL arranged in parallel, and a plurality of sub-memory arrays 10. The word common-source lines WSL include a first word common-source line WSL1 and a second word common-source line WSL2. The bit lines BL are perpendicular to the word common-source lines WSL. The bit lines BL include a first bit line BL1 and a second bit line BL2. Each sub-memory array 10 is coupled to two of the word—common-source lines WSL and two of the bit lines BL. Each sub-memory array 10 includes a first memory cell 100, a second memory cell 101, a third memory cell 102, and a fourth memory cell 103. The first memory cell 100 is coupled to the first word common-source line WSL1 and the first bit line BL1. The second memory cell 101 is coupled to the first word common-source line WSL1 and the second bit line BL2. The third memory cell 102 is coupled to the second word common-source line WSL2 and the second bit line BL2. The fourth memory cell 103 is coupled to the second word common-source line WSL2 and the first bit line BL1. In some embodiments of the present invention, the first memory cell 100 and the second memory cell 101 are symmetric about the first word common-source line WSL1, the third memory cell 102 and the fourth memory cell 103 are symmetric about the second word common-source line WSL2, and the second memory cell 101 and the third memory cell 102 are located between the first memory cell 100 and the fourth memory cell 103.

Figure 3:
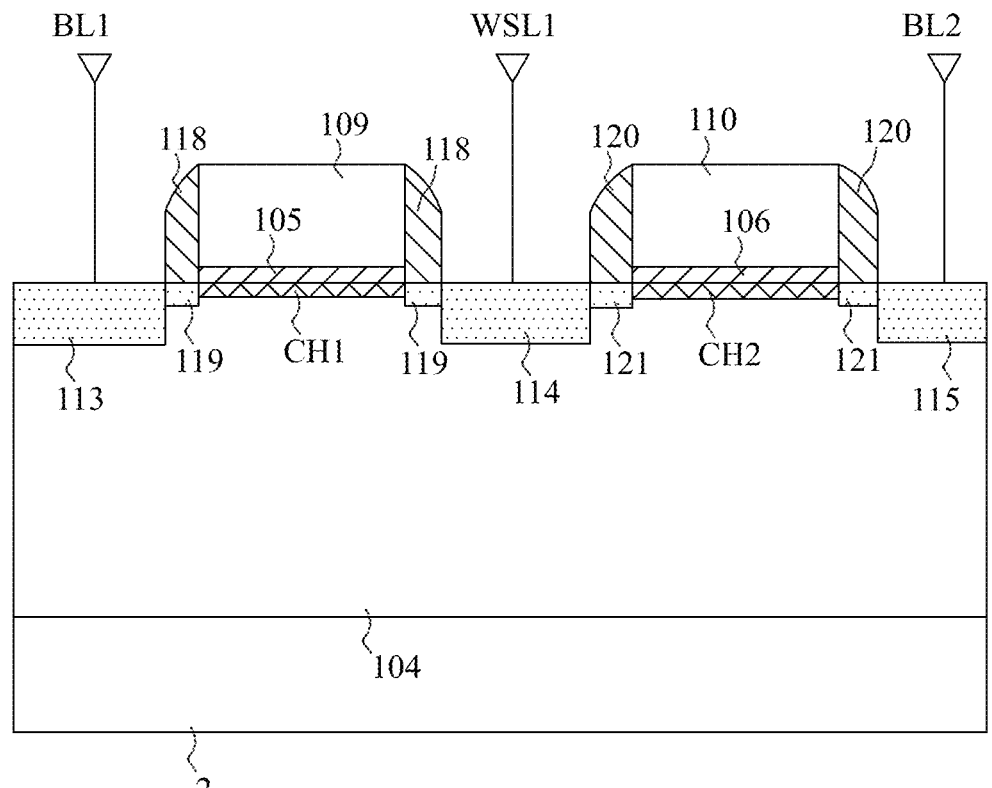
FIG. 3 is a cross-sectional view of a first memory cell and a second memory cell according to an embodiment of the present invention.
Figure 4:
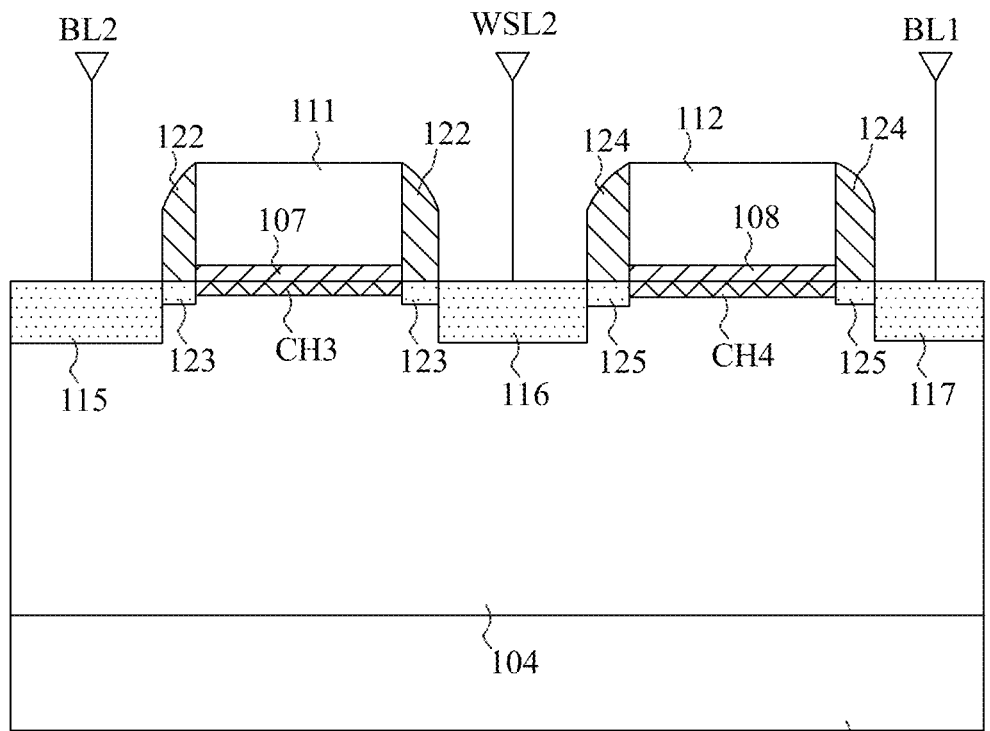
FIG. 4 is a cross-sectional view of a third memory cell and a fourth memory cell according to an embodiment of the present invention.

FIG. 3 is a cross-sectional view of a first memory cell and a second memory cell according to an embodiment of the present invention. FIG. 4 is a cross-sectional view of a third memory cell and a fourth memory cell according to an embodiment of the present invention. Referring to FIG. 2, FIG. 3, and FIG. 4, the first memory cell 100, the second memory cell 101, the third memory cell 102, and the fourth memory cell 103 are formed in a semiconductor region 104 having a first conductivity type. The semiconductor region 104 may be a semiconductor substrate or an epitaxial layer formed on a semiconductor substrate. In the embodiment, the semiconductor region 104 is exemplified by an epitaxial layer formed on a semiconductor substrate 2. The first memory cell 100, the second memory cell 101, the third memory cell 102, and the fourth memory cell 103 commonly include a first gate dielectric block 105, a second gate dielectric block 106, a third gate dielectric block 107, a fourth gate dielectric block 108, a first conductive gate 109, a second conductive gate 110, a third conductive gate 111, a fourth conductive gate 112, a first heavily-doped area 113, a second heavily-doped area 114, a third heavily-doped area 115, a fourth heavily-doped area 116, and a fifth heavily-doped area 117. The word common-source lines WSL, the first gate dielectric block 105, the second gate dielectric block 106, the third gate dielectric block 107, and the fourth gate dielectric block 108 are a part of a dielectric layer. The first conductive gate 109, the second conductive gate 110, the third conductive gate 111, and the fourth conductive gate 112 are a part of an electrode layer. The first gate dielectric block 105, the second gate dielectric block 106, the third gate dielectric block 107, and the fourth gate dielectric block 108 respectively formed on the semiconductor region 104. The first conductive gate 109, the second conductive gate 110, the third conductive gate 111, and the fourth conductive gate 112 are respectively formed on the first gate dielectric block 105, the second gate dielectric block 106, the third gate dielectric block 107, and the fourth gate dielectric block 108. The first heavily-doped area 113 and the second heavily-doped area 114 are formed in the semiconductor region 104, respectively formed on two opposite side of the semiconductor region 104, which is directly arranged under the first conductive gate 109, and respectively coupled to the first bit line BL1 and the first word common-source line WSL1. The first heavily-doped area 113 and the second heavily-doped area 114 have a second conductivity type opposite to the first conductivity type. In the embodiment, the first conductivity type is a P-type and the second conductivity type is an N type. The first bit line BL1 is a part of a first conduction metal layer. The second bit line BL2 is a part of a second conduction metal layer. The electrode layer, the first conduction metal layer, and the second conduction metal layer are sequentially arranged from bottom to top. The third heavily-doped area 115 is formed in the semiconductor region 104. The second heavily-doped area 114 and the third heavily-doped area 115 are respectively formed on two opposite side of the semiconductor region 104, which is directly arranged under the second conductive gate 110. The third heavily-doped area 115 is coupled to the second bit line BL2. The third heavily-doped area 115 has the second conductivity type. The fourth heavily-doped area 116 is formed in the semiconductor region 104. The third heavily-doped area 115 and the fourth heavily-doped area 116 are respectively formed on two opposite side of the semiconductor region 104, which is directly arranged under the third conductive gate 111. The fourth heavily-doped area 116 is coupled to the second word common-source line WSL2. The fourth heavily-doped area 116 has the second conductivity type. The fifth heavily-doped area 117 is formed in the semiconductor region 104. The fourth heavily-doped area 116 and the fifth heavily-doped area 117 are respectively formed on two opposite side of the semiconductor region 104, which is directly arranged under the fourth conductive gate 112. The fifth heavily-doped area 117 is coupled to the first bit line BL1. The fifth heavily-doped area 117 has the second conductivity type.

The dielectric layer is penetrated with a first conduction via H1, a second conduction via H2, and a third conduction via H3. The first heavily-doped area 113 is coupled to the first bit line BL1 through the first conduction via H1. The fifth heavily-doped area 117 is coupled to the first bit line BL1 through the third conduction via H3. The second conduction via H2 overlaps the second bit line BL2, a fourth conduction via H4, and a first conduction metal block BK1. The first conduction metal block BK1 is a part of the first conduction metal layer. The third heavily-doped area 115 is coupled to the second bit line BL2 through the second conduction via H2, the first conduction metal block BK1, and a fourth conduction via H4 in order. As illustrated in FIG. 1, FIG. 2, and FIG. 3, the first word common-source line WSL1 overlaps the second heavily-doped area 114, a second conduction metal block BK2, and a fifth conduction via H5. The fifth conduction via H5, penetrating through the dielectric layer, is coupled between the second conduction metal block BK2 and the second heavily-doped area 114. Thus, the second heavily-doped area 114 is coupled to an external voltage through the fifth conduction via H5 and the second conduction metal block BK2. As illustrated in FIG. 1, FIG. 2, and FIG. 4, the second word common-source line WSL2 overlaps the fourth heavily-doped area 116, a third conduction metal block BK3, and a sixth conduction via H6.

The sixth conduction via H6, penetrating through the dielectric layer, is coupled between the third conduction metal block BK3 and the fourth heavily-doped area 116. Thus, the fourth heavily-doped area 116 is coupled to an external voltage through the sixth conduction via H6 and the third conduction metal block BK3.

Figure 5:
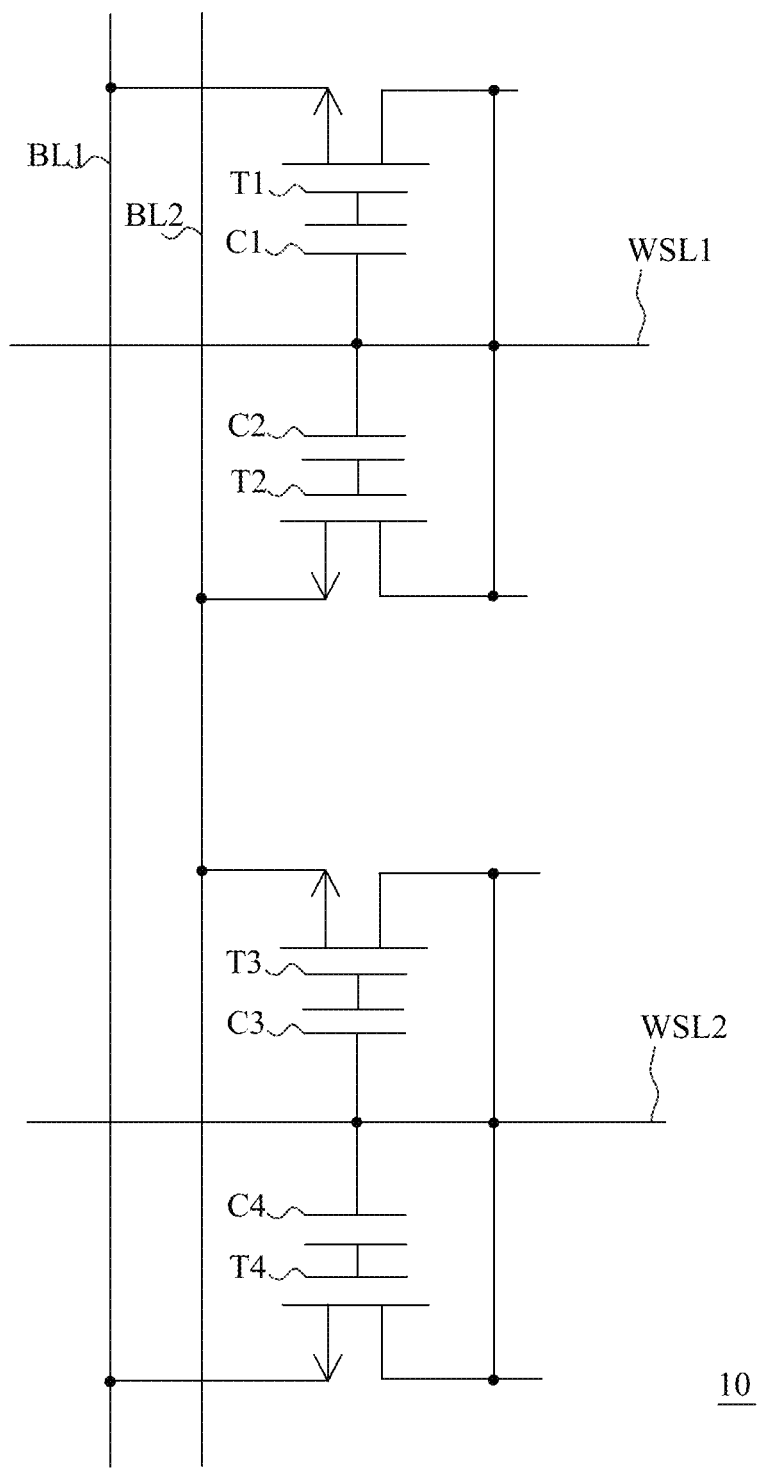
FIG. 5 is a schematic diagram illustrating the equivalent circuit of a sub-memory array according to an embodiment of the present invention.

FIG. 5 is a schematic diagram illustrating the equivalent circuit of a sub-memory array according to an embodiment of the present invention. Please refer to FIG. 3, FIG. 4, and FIG. 5. The first heavily-doped area 113, the second heavily-doped area 114, the first gate dielectric block 105, the semiconductor region 104, and the first conductive gate 109 form a first metal-oxide-semiconductor field-effect transistor (MOSFET) T1. The first conductive gate 109 and the second heavily-doped area 114 form a first capacitor C1. The first heavily-doped area 113 is used as a source and the second heavily-doped area 114 is used as a drain. The two sidewalls of the first conductive gate 109 are respectively provided with two first sidewall spacers 118 that extend to the sidewall of the first gate dielectric block 105. There are two first lightly-doped drains (LDDs) 119 which are directly respectively formed under the two first sidewall spacers 118. When the first MOSFET T1 is turned on, a channel region CH1 is formed between the first LDDs 119.

The third heavily-doped area 115, the second heavily-doped area 114, the second gate dielectric block 106, the semiconductor region 104, and the second conductive gate 110 form a second metal-oxide-semiconductor field-effect transistor (MOSFET) T2. The second conductive gate 110 and the second heavily-doped area 114 form a second capacitor C2. The third heavily-doped area 115 is used as a source and the second heavily-doped area 114 is used as a drain. The two sidewalls of the second conductive gate 110 are respectively provided with two second sidewall spacers 120 that extend to the sidewall of the second gate dielectric block 106. There are two second lightly-doped drains (LDDs) 121 which are directly respectively formed under the two second sidewall spacers 120. When the second MOSFET T2 is turned on, a channel region CH2 is formed between the second LDDs 121.

The third heavily-doped area 115, the fourth heavily-doped area 116, the third gate dielectric block 107, the semiconductor region 104, and the third conductive gate 111 form a third metal-oxide-semiconductor field-effect transistor (MOSFET) T3. The third conductive gate 111 and the fourth heavily-doped area 116 form a third capacitor C3. The third heavily-doped area 115 is used as a source and the fourth heavily-doped area 116 is used as a drain. The two sidewalls of the third conductive gate 111 are respectively provided with two third sidewall spacers 122 that extend to the sidewall of the third gate dielectric block 107. There are two third lightly-doped drains (LDDs) 123 which are directly respectively formed under the two third sidewall spacers 122. When the third MOSFET T3 is turned on, a channel region CH3 is formed between the third LDDs 123.

The fifth heavily-doped area 117, the fourth heavily-doped area 116, the fourth gate dielectric block 108, the semiconductor region 104, and the fourth conductive gate 112 form a fourth metal-oxide-semiconductor field-effect transistor (MOSFET) T4. The fourth conductive gate 112 and the fourth heavily-doped area 116 form a fourth capacitor C4. The fifth heavily-doped area 117 is used as a source and the fourth heavily-doped area 116 is used as a drain. The two sidewalls of the fourth conductive gate 112 are respectively provided with two fourth sidewall spacers 124 that extend to the sidewall of the fourth gate dielectric block 108. There are two fourth lightly-doped drains (LDDs) 125 which are directly respectively formed under the two fourth sidewall spacers 124. When the fourth MOSFET T4 is turned on, a channel region CH4 is formed between the fourth LDDs 125.

The operation of the first memory cell 100 is introduced as follows, including those of programming, erasing, and reading activities. The word common-source line or the bit line is electrically floating or coupled to a high voltage, a middle voltage, or a grounding voltage based on the process characteristics.

When the first memory cell 100 is selected to perform a programming activity, the semiconductor region 104 is coupled to a grounding voltage, the first bit line BL1 is coupled to a middle voltage or the grounding voltage, and the first word common-source line WSL1 is coupled to the middle voltage or a high voltage. When the first memory cell 100 is not selected to perform a programming activity, the semiconductor region 104 is coupled to the grounding voltage, the first bit line BL1 is electrically floating or coupled to a low voltage, and the first word common-source line WSL1 is coupled to the grounding voltage. When the first memory cell 100 is selected to perform an erasing activity, the semiconductor region 104 is coupled to the grounding voltage, the first bit line BL1 is coupled to the high voltage, and the first word common-source line WSL1 is coupled to the grounding voltage. When the first memory cell 100 is not selected to perform an erasing activity, the semiconductor region 104 is coupled to the grounding voltage, the first bit line BL1 is electrically floating, and the first word common-source WSL1 is coupled to the low voltage or the middle voltage. When the first memory cell 100 is selected to perform a reading activity, the semiconductor region 104 and the first bit line BL1 are coupled to the grounding voltage and the first word common-source line WSL1 is coupled to the low voltage. When the first memory cell 100 is not selected to perform a reading activity, the semiconductor region 104, the first bit line BL1, and the first word common-source line WSL1 are coupled to the grounding voltage. In the foregoing operation, the high voltage is greater than the middle voltage, the middle voltage is greater than the low voltage, and the low voltage is greater than the grounding voltage. Specifically, the high voltage is slightly lower than the drain-to-source breakdown voltage of the first MOSFET T1. That is to say, the high voltage is equal to the drain-to-source breakdown voltage of the first MOSFET T1 minus the threshold voltage of the first MOSFET T1. The middle voltage is equal to the drain-to-source breakdown voltage of the first MOSFET T1×0.5. The low voltage is equal to the drain-to-source breakdown voltage of the first MOSFET T1×0.25. The grounding voltage is zero voltage. Based on the foregoing operation, the first memory cell 100 employs the drain of the first MOSFET T1 to provide a gate voltage, thereby greatly reducing the area of a capacitor.

The operation of the second memory cell 101 is introduced as follows, including those of programming, erasing, and reading activities. The word common-source line or the bit line is electrically floating or coupled to a high voltage, a middle voltage, or a grounding voltage based on the process characteristics.

When the second memory cell 101 is selected to perform a programming activity, the semiconductor region 104 is coupled to a grounding voltage, the second bit line BL2 is coupled to a middle voltage or the grounding voltage, and the first word common-source line WSL1 is coupled to the middle voltage or a high voltage. When the second memory cell 101 is not selected to perform a programming activity, the semiconductor region 104 is coupled to the grounding voltage, the second bit line BL2 is electrically floating or coupled to a low voltage, and the first word common-source line WSL1 is coupled to the grounding voltage. When the second memory cell 101 is selected to perform an erasing activity, the semiconductor region 104 is coupled to the grounding voltage, the second bit line BL2 is coupled to the high voltage, and the first word common-source line WSL1 is coupled to the grounding voltage.

When the second memory cell 101 is not selected to perform an erasing activity, the semiconductor region 104 is coupled to the grounding voltage, the second bit line BL2 is electrically floating, and the first word common-source WSL1 is coupled to the low voltage or the middle voltage. When the second memory cell 101 is selected to perform a reading activity, the semiconductor region 104 and the second bit line BL2 are coupled to the grounding voltage and the first word common-source line WSL1 is coupled to the low voltage. When the second memory cell 101 is not selected to perform a reading activity, the semiconductor region 104, the second bit line BL2, and the first word common-source line WSL1 are coupled to the grounding voltage. In the foregoing operation, the high voltage is greater than the middle voltage, the middle voltage is greater than the low voltage, and the low voltage is greater than the grounding voltage. Specifically, the high voltage is slightly lower than the drain-to-source breakdown voltage of the second MOSFET T2. That is to say, the high voltage is equal to the drain-to-source breakdown voltage of the second MOSFET T2 minus the threshold voltage of the second MOSFET T2. The middle voltage is equal to the drain-to-source breakdown voltage of the second MOSFET T2×0.5. The low voltage is equal to the drain-to-source breakdown voltage of the second MOSFET T2×0.25. The grounding voltage is zero voltage. Based on the foregoing operation, the second memory cell 101 employs the drain of the second MOSFET T2 to provide a gate voltage, thereby greatly reducing the area of a capacitor.

The operation of the third memory cell 102 is introduced as follows, including those of programming, erasing, and reading activities. The word common-source line or the bit line is electrically floating or coupled to a high voltage, a middle voltage, or a grounding voltage based on the process characteristics.

When the third memory cell 102 is selected to perform a programming activity, the semiconductor region 104 is coupled to a grounding voltage, the second bit line BL2 is coupled to a middle voltage or the grounding voltage, and the second word common-source line WSL2 is coupled to the middle voltage or a high voltage. When the third memory cell 102 is not selected to perform a programming activity, the semiconductor region 104 is coupled to the grounding voltage, the second bit line BL2 is electrically floating or coupled to a low voltage, and the second word common-source line WSL2 is coupled to the grounding voltage. When the third memory cell 102 is selected to perform an erasing activity, the semiconductor region 104 is coupled to the grounding voltage, the second bit line BL2 is coupled to the high voltage, and the second word common-source line WSL2 is coupled to the grounding voltage. When the third memory cell 102 is not selected to perform an erasing activity, the semiconductor region 104 is coupled to the grounding voltage, the second bit line BL2 is electrically floating, and the second word common-source WSL2 is coupled to the low voltage or the middle voltage. When the third memory cell 102 is selected to perform a reading activity, the semiconductor region 104 and the second bit line BL2 are coupled to the grounding voltage and the second word common-source line WSL2 is coupled to the low voltage. When the third memory cell 102 is not selected to perform a reading activity, the semiconductor region 104, the second bit line BL2, and the second word common-source line WSL2 are coupled to the grounding voltage. In the foregoing operation, the high voltage is greater than the middle voltage, the middle voltage is greater than the low voltage, and the low voltage is greater than the grounding voltage. Specifically, the high voltage is slightly lower than the drain-to-source breakdown voltage of the third MOSFET T3. That is to say, the high voltage is equal to the drain-to-source breakdown voltage of the third MOSFET T3 minus the threshold voltage of the third MOSFET T3. The middle voltage is equal to the drain-to-source breakdown voltage of the third MOSFET T3×0.5. The low voltage is equal to the drain-to-source breakdown voltage of the third MOSFET T3×0.25. The grounding voltage is zero voltage. Based on the foregoing operation, the third memory cell 102 employs the drain of the third MOSFET T3 to provide a gate voltage, thereby greatly reducing the area of a capacitor.

The operation of the fourth memory cell 103 is introduced as follows, including those of programming, erasing, and reading activities. The word common-source line or the bit line is electrically floating or coupled to a high voltage, a middle voltage, or a grounding voltage based on the process characteristics.

When the fourth memory cell 103 is selected to perform a programming activity, the semiconductor region 104 is coupled to a grounding voltage, the first bit line BL1 is coupled to a middle voltage or the grounding voltage, and the second word common-source line WSL2 is coupled to the middle voltage or a high voltage. When the fourth memory cell 103 is not selected to perform a programming activity, the semiconductor region 104 is coupled to the grounding voltage, the first bit line BL1 is electrically floating or coupled to a low voltage, and the second word common-source line WSL2 is coupled to the grounding voltage. When the fourth memory cell 103 is selected to perform an erasing activity, the semiconductor region 104 is coupled to the grounding voltage, the first bit line BL1 is coupled to the high voltage, and the second word common-source line WSL2 is coupled to the grounding voltage. When the fourth memory cell 103 is not selected to perform an erasing activity, the semiconductor region 104 is coupled to the grounding voltage, the first bit line BL1 is electrically floating, and the second word common-source WSL2 is coupled to the low voltage or the middle voltage. When the fourth memory cell 103 is selected to perform a reading activity, the semiconductor region 104 and the first bit line BL1 are coupled to the grounding voltage and the second word common-source line WSL2 is coupled to the low voltage. When the fourth memory cell 103 is not selected to perform a reading activity, the semiconductor region 104, the first bit line BL1, and the second word common-source line WSL2 are coupled to the grounding voltage. In the foregoing operation, the high voltage is greater than the middle voltage, the middle voltage is greater than the low voltage, and the low voltage is greater than the grounding voltage. Specifically, the high voltage is slightly lower than the drain-to-source breakdown voltage of the fourth MOSFET T4. That is to say, the high voltage is equal to the drain-to-source breakdown voltage of the fourth MOSFET T4 minus the threshold voltage of the fourth MOSFET T4. The middle voltage is equal to the drain-to-source breakdown voltage of the fourth MOSFET T4×0.5. The low voltage is equal to the drain-to-source breakdown voltage of the fourth MOSFET T4×0.25. The grounding voltage is zero voltage. Based on the foregoing operation, the fourth memory cell 103 employs the drain of the fourth MOSFET T4 to provide a gate voltage, thereby greatly reducing the area of a capacitor.

Figure 6:
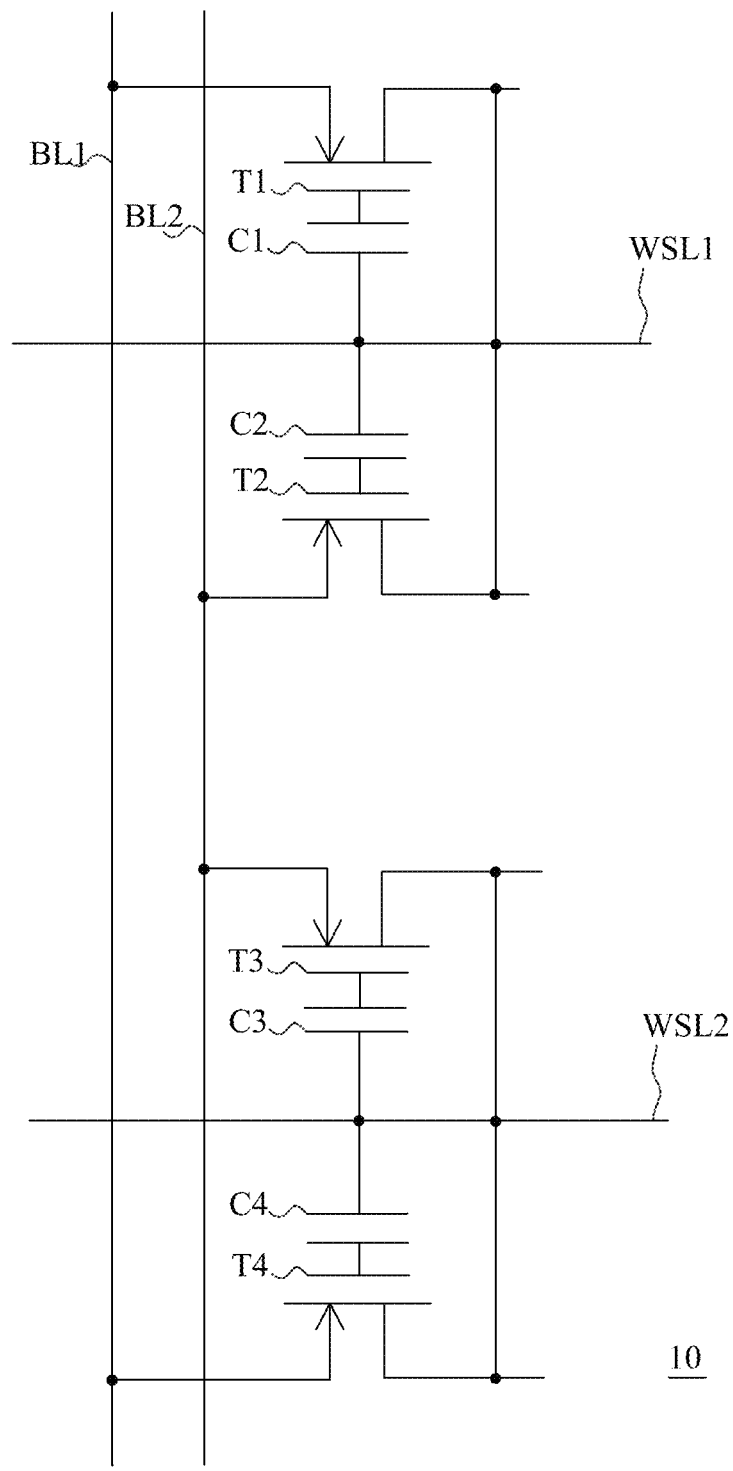
FIG. 6 is a schematic diagram illustrating the equivalent circuit of a sub-memory array according to another embodiment of the present invention.

FIG. 6 is a schematic diagram illustrating the equivalent circuit of a sub-memory array according to another embodiment of the present invention. Please refer to FIG. 3, FIG. 4, and FIG. 6. In the embodiment, the first conductivity type is an N type and the second conductivity type is a P type. The operation of the first memory cell 100 is introduced as follows, including those of programming, erasing, and reading activities. The word common-source line or the bit line is electrically floating or coupled to a high voltage, a middle voltage, or a grounding voltage based on the process characteristics.

When the first memory cell 100 is selected to perform a programming activity, the semiconductor region 104 is coupled to a high voltage, the first bit line BL1 is coupled to a middle voltage or the high voltage, and the first word common-source line WSL1 is coupled to the middle voltage or a grounding voltage. When the first memory cell 100 is not selected to perform a programming activity, the semiconductor region 104 is coupled to the high voltage, the first bit line BL1 is electrically floating or coupled to a middle voltage, and the first word common-source line WSL1 is coupled to the high voltage. When the first memory cell 100 is selected to perform an erasing activity, the semiconductor region 104 is coupled to the high voltage, the first bit line BL1 is coupled to the grounding voltage, and the first word common-source line WSL1 is coupled to the high voltage. When the first memory cell 100 is not selected to perform an erasing activity, the semiconductor region 104 is coupled to the high voltage, the first bit line BL1 is electrically floating, and the first word common-source WSL1 is coupled to the middle voltage. When the first memory cell 100 is selected to perform a reading activity, the semiconductor region 104 and the first bit line BL1 are coupled to the middle voltage and the first word common-source line WSL1 is coupled to the low voltage. When the first memory cell 100 is not selected to perform a reading activity, the semiconductor region 104, the first bit line BL1, and the first word common-source line WSL1 are coupled to the middle voltage. In the foregoing operation, the high voltage is greater than the middle voltage, the middle voltage is greater than the low voltage, and the low voltage is greater than the grounding voltage. Specifically, the high voltage is slightly lower than the source-to-drain breakdown voltage of the first MOSFET T1. That is to say, the high voltage is equal to the source-to-drain breakdown voltage of the first MOSFET T1 plus the threshold voltage of the first MOSFET T1. The middle voltage is equal to the source-to-drain breakdown voltage of the first MOSFET T1×0.5. The low voltage is equal to the source-to-drain breakdown voltage of the first MOSFET T1×0.25. The grounding voltage is zero voltage. Based on the foregoing operation, the first memory cell 100 employs the drain of the first MOSFET T1 to provide a gate voltage, thereby greatly reducing the area of a capacitor.

The operation of the second memory cell 101 is introduced as follows, including those of programming, erasing, and reading activities. The word common-source line or the bit line is electrically floating or coupled to a high voltage, a middle voltage, or a grounding voltage based on the process characteristics.

When the second memory cell 101 is selected to perform a programming activity, the semiconductor region 104 is coupled to a high voltage, the second bit line BL2 is coupled to a middle voltage or the high voltage, and the first word common-source line WSL1 is coupled to the middle voltage or a grounding voltage. When the second memory cell 101 is not selected to perform a programming activity, the semiconductor region 104 is coupled to the high voltage, the second bit line BL2 is electrically floating or coupled to a middle voltage, and the first word common-source line WSL1 is coupled to the high voltage. When the second memory cell 101 is selected to perform an erasing activity, the semiconductor region 104 is coupled to the high voltage, the second bit line BL2 is coupled to the grounding voltage, and the first word common-source line WSL1 is coupled to the high voltage. When the second memory cell 101 is not selected to perform an erasing activity, the semiconductor region 104 is coupled to the high voltage, the second bit line BL2 is electrically floating, and the first word common-source WSL1 is coupled to the middle voltage. When the second memory cell 101 is selected to perform a reading activity, the semiconductor region 104 and the second bit line BL2 are coupled to the middle voltage and the first word common-source line WSL1 is coupled to the low voltage. When the second memory cell 101 is not selected to perform a reading activity, the semiconductor region 104, the second bit line BL2, and the first word common-source line WSL1 are coupled to the middle voltage. In the foregoing operation, the high voltage is greater than the middle voltage, the middle voltage is greater than the low voltage, and the low voltage is greater than the grounding voltage. Specifically, the high voltage is slightly lower than the source-to-drain breakdown voltage of the second MOSFET T2. That is to say, the high voltage is equal to the source-to-drain breakdown voltage of the second MOSFET T2 plus the threshold voltage of the second MOSFET T2. The middle voltage is equal to the source-to-drain breakdown voltage of the second MOSFET T2×0.5. The low voltage is equal to the source-to-drain breakdown voltage of the second MOSFET T2×0.25. The grounding voltage is zero voltage. Based on the foregoing operation, the second memory cell 101 employs the drain of the second MOSFET T2 to provide a gate voltage, thereby greatly reducing the area of a capacitor.

The operation of the third memory cell 102 is introduced as follows, including those of programming, erasing, and reading activities. The word common-source line or the bit line is electrically floating or coupled to a high voltage, a middle voltage, or a grounding voltage based on the process characteristics.

When the third memory cell 102 is selected to perform a programming activity, the semiconductor region 104 is coupled to a high voltage, the second bit line BL2 is coupled to a middle voltage or the high voltage, and the second word common-source line WSL2 is coupled to the middle voltage or a grounding voltage. When the third memory cell 102 is not selected to perform a programming activity, the semiconductor region 104 is coupled to the high voltage, the second bit line BL2 is electrically floating or coupled to a middle voltage, and the second word common-source line WSL2 is coupled to the high voltage. When the third memory cell 102 is selected to perform an erasing activity, the semiconductor region 104 is coupled to the high voltage, the second bit line BL2 is coupled to the grounding voltage, and the second word common-source line WSL2 is coupled to the high voltage. When the third memory cell 102 is not selected to perform an erasing activity, the semiconductor region 104 is coupled to the high voltage, the second bit line BL2 is electrically floating, and the second word common-source WSL2 is coupled to the middle voltage. When the third memory cell 102 is selected to perform a reading activity, the semiconductor region 104 and the second bit line BL2 are coupled to the middle voltage and the second word common-source line WSL2 is coupled to the low voltage. When the third memory cell 102 is not selected to perform a reading activity, the semiconductor region 104, the second bit line BL2, and the second word common-source line WSL2 are coupled to the middle voltage. In the foregoing operation, the high voltage is greater than the middle voltage, the middle voltage is greater than the low voltage, and the low voltage is greater than the grounding voltage. Specifically, the high voltage is slightly lower than the source-to-drain breakdown voltage of the third MOSFET T3. That is to say, the high voltage is equal to the source-to-drain breakdown voltage of the third MOSFET T3 plus the threshold voltage of the third MOSFET T3. The middle voltage is equal to the source-to-drain breakdown voltage of the third MOSFET T3×0.5. The low voltage is equal to the source-to-drain breakdown voltage of the third MOSFET T3×0.25. The grounding voltage is zero voltage. Based on the foregoing operation, the third memory cell 102 employs the drain of the third MOSFET T3 to provide a gate voltage, thereby greatly reducing the area of a capacitor.

The operation of the fourth memory cell 103 is introduced as follows, including those of programming, erasing, and reading activities. The word common-source line or the bit line is electrically floating or coupled to a high voltage, a middle voltage, or a grounding voltage based on the process characteristics.

When the fourth memory cell 103 is selected to perform a programming activity, the semiconductor region 104 is coupled to a high voltage, the first bit line BL1 is coupled to a middle voltage or the high voltage, and the second word common-source line WSL2 is coupled to the middle voltage or a grounding voltage. When the fourth memory cell 103 is not selected to perform a programming activity, the semiconductor region 104 is coupled to the high voltage, the first bit line BL1 is electrically floating or coupled to a middle voltage, and the second word common-source line WSL2 is coupled to the high voltage. When the fourth memory cell 103 is selected to perform an erasing activity, the semiconductor region 104 is coupled to the high voltage, the first bit line BL1 is coupled to the grounding voltage, and the second word common-source line WSL2 is coupled to the high voltage. When the fourth memory cell 103 is not selected to perform an erasing activity, the semiconductor region 104 is coupled to the high voltage, the first bit line BL1 is electrically floating, and the second word common-source WSL2 is coupled to the middle voltage. When the fourth memory cell 103 is selected to perform a reading activity, the semiconductor region 104 and the first bit line BL1 are coupled to the middle voltage and the second word common-source line WSL2 is coupled to the low voltage. When the fourth memory cell 103 is not selected to perform a reading activity, the semiconductor region 104, the first bit line BL1, and the second word common-source line WSL2 are coupled to the middle voltage. In the foregoing operation, the high voltage is greater than the middle voltage, the middle voltage is greater than the low voltage, and the low voltage is greater than the grounding voltage. Specifically, the high voltage is slightly lower than the source-to-drain breakdown voltage of the fourth MOSFET T4. That is to say, the high voltage is equal to the source-to-drain breakdown voltage of the fourth MOSFET T4 plus the threshold voltage of the fourth MOSFET T4. The middle voltage is equal to the source-to-drain breakdown voltage of the fourth MOSFET T4×0.5. The low voltage is equal to the source-to-drain breakdown voltage of the fourth MOSFET T4×0.25. The grounding voltage is zero voltage. Based on the foregoing operation, the fourth memory cell 103 employs the drain of the fourth MOSFET T4 to provide a gate voltage, thereby greatly reducing the area of a capacitor.

Figure 7:
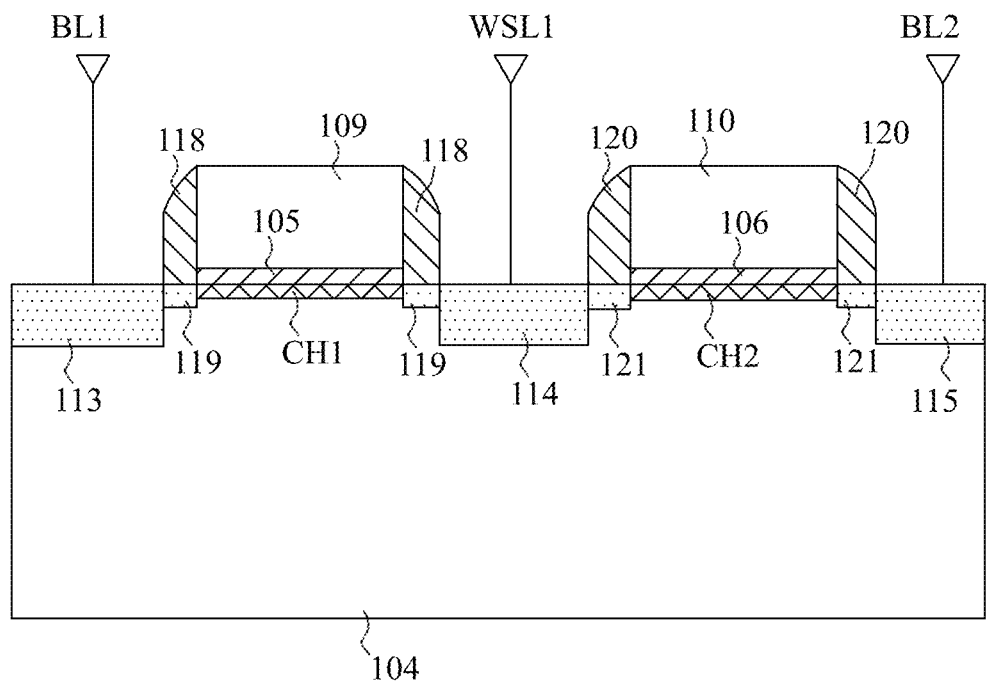
FIG. 7 is a cross-sectional view of a first memory cell and a second memory cell according to another embodiment of the present invention.
Figure 8:
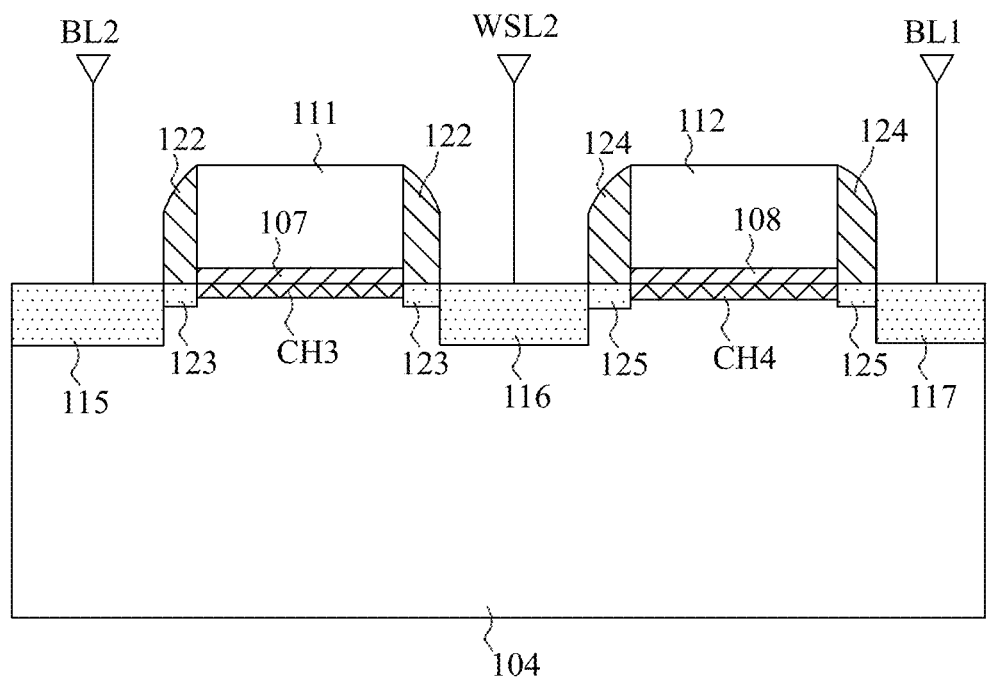
FIG. 8 is a cross-sectional view of a third memory cell and a fourth memory cell according to another embodiment of the present invention.

FIG. 7 is a cross-sectional view of a first memory cell and a second memory cell according to another embodiment of the present invention. FIG. 8 is a cross-sectional view of a third memory cell and a fourth memory cell according to another embodiment of the present invention. Referring to FIG. 7 and FIG. 8, the first memory cell 100, the second memory cell 101, the third memory cell 102, and the fourth memory cell 103 are formed in the semiconductor region 104 implemented with a semiconductor substrate. The other structures of the first memory cell 100, the second memory cell 101, the third memory cell 102, and the fourth memory cell 103 have been described previously so it will not be reiterated.

According to the embodiments provided above, the multi-write read-only memory array employs the drain of a field-effect transistor to provide a gate voltage to greatly reduce the area of a capacitor.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A multi-write read-only memory array comprising:
   a plurality of word common-source lines, arranged in parallel, comprising a first word common-source line and a second word common-source line;
   a plurality of bit lines arranged in parallel, wherein the plurality of bit lines perpendicular to the plurality of word common-source lines comprise a first bit line and a second bit line; and
   a plurality of sub-memory arrays each coupled to two of the plurality of word common-source lines and two of the plurality of bit lines, wherein each of the plurality of sub-memory arrays comprises:
      a first memory cell coupled to the first word common-source line and the first bit line;
      a second memory cell coupled to the first word common-source line and the second bit line;
      a third memory cell coupled to the second word common-source line and the second bit line; and
      a fourth memory cell coupled to the second word common-source line and the first bit line.

2. The multi-write read-only memory array according to claim 1, wherein the first memory cell and the second memory cell are symmetric about the first word common-source line, the third memory cell and the fourth memory cell are symmetric about the second word common-source line, and the second memory cell and the third memory cell are located between the first memory cell and the fourth memory cell.

3. The multi-write read-only memory array according to claim 2, wherein the first memory cell, the second memory cell, the third memory cell, and the fourth memory cell are formed in a semiconductor region having a first conductivity type, and the first memory cell, the second memory cell, the third memory cell, and the fourth memory cell commonly comprise:
   a first gate dielectric block, a second gate dielectric block, a third gate dielectric block, and a fourth gate dielectric block respectively formed on the semiconductor region;
   a first conductive gate, a second conductive gate, a third conductive gate, and a fourth conductive gate respectively formed on the first gate dielectric block, the second gate dielectric block, the third gate dielectric block, and the fourth gate dielectric block;
   a first heavily-doped area and a second heavily-doped area formed in the semiconductor region, respectively formed on two opposite side of the semiconductor region, which is directly arranged under the first conductive gate, and respectively coupled to the first bit line and the first word common-source line, wherein the first heavily-doped area and the second heavily-doped area have a second conductivity type opposite to the first conductivity type;
   a third heavily-doped area formed in the semiconductor region, the second heavily-doped area and the third heavily-doped area are respectively formed on two opposite side of the semiconductor region, which is directly arranged under the second conductive gate, the third heavily-doped area is coupled to the second bit line, and the third heavily-doped area has the second conductivity type;
   a fourth heavily-doped area formed in the semiconductor region, the third heavily-doped area and the fourth heavily-doped area are respectively formed on two opposite side of the semiconductor region, which is directly arranged under the third conductive gate, the fourth heavily-doped area is coupled to the second word common-source line, and the fourth heavily-doped area has the second conductivity type; and
   a fifth heavily-doped area formed in the semiconductor region, the fourth heavily-doped area and the fifth heavily-doped area are respectively formed on two opposite side of the semiconductor region, which is directly arranged under the fourth conductive gate, the fifth heavily-doped area is coupled to the first bit line, and the fifth heavily-doped area has the second conductivity type.

4. The multi-write read-only memory array according to claim 3, wherein the first conductivity type is a P type and the second conductivity type is an N type.

5. The multi-write read-only memory array according to claim 4, wherein when the first memory cell is selected to perform a programming activity, the semiconductor region is coupled to a grounding voltage, the first bit line is coupled to a middle voltage or the grounding voltage, and the first word common-source line is coupled to the middle voltage or a high voltage, wherein the high voltage is greater than the middle voltage and the middle voltage is greater than the grounding voltage.

6. The multi-write read-only memory array according to claim 4, wherein when the first memory cell is not selected to perform a programming activity, the semiconductor region is coupled to a grounding voltage, the first bit line is electrically floating or coupled to a low voltage, and the first word common-source line is coupled to the grounding voltage, wherein the low voltage is greater than the grounding voltage.

7. The multi-write read-only memory array according to claim 4, wherein when the first memory cell is selected to perform an erasing activity, the semiconductor region is coupled to a grounding voltage, the first bit line is coupled to a high voltage, and the first word common-source line is coupled to the grounding voltage, wherein the high voltage is greater than the grounding voltage.

8. The multi-write read-only memory array according to claim 4, wherein when the first memory cell is not selected to perform an erasing activity, the semiconductor region is coupled to a grounding voltage, the first bit line is electrically floating, and the first word common-source line is coupled to a low voltage or a middle voltage, wherein the middle voltage is greater than the low voltage and the low voltage greater than the grounding voltage.

9. The multi-write read-only memory array according to claim 4, wherein when the first memory cell is selected to perform a reading activity, the semiconductor region and the first bit line are coupled to a grounding voltage and the first word common-source line is coupled to a low voltage, wherein the low voltage is greater than the grounding voltage.

10. The multi-write read-only memory array according to claim 4, wherein when the first memory cell is not selected to perform a reading activity, the semiconductor region, the first bit line, and the first word common-source line are coupled to a grounding voltage.

11. The multi-write read-only memory array according to claim 3, wherein the first conductivity type is an N type and the second conductivity type is a P type.

12. The multi-write read-only memory array according to claim 11, wherein when the first memory cell is selected to perform a programming activity, the semiconductor region is coupled to a high voltage, the first bit line is coupled to a middle voltage or the high voltage, and the first word common-source line is coupled to the middle voltage or a grounding voltage, wherein the high voltage is greater than the middle voltage and the middle voltage is greater than the grounding voltage.

13. The multi-write read-only memory array according to claim 11, wherein when the first memory cell is not selected to perform a programming activity, the semiconductor region is coupled to a high voltage, the first bit line is electrically floating or coupled to a middle voltage, and the first word common-source line is coupled to the high voltage, wherein the high voltage is greater than the middle voltage.

14. The multi-write read-only memory array according to claim 11, wherein when the first memory cell is selected to perform an erasing activity, the semiconductor region is coupled to a high voltage, the first bit line is coupled to a grounding voltage, and the first word common-source line is coupled to the high voltage, wherein the high voltage is greater than the grounding voltage.

15. The multi-write read-only memory array according to claim 11, wherein when the first memory cell is not selected to perform an erasing activity, the semiconductor region is coupled to a high voltage, the first bit line is electrically floating, and the first word common-source line is coupled to a middle voltage, wherein the high voltage is greater than the middle voltage.

16. The multi-write read-only memory array according to claim 11, wherein when the first memory cell is selected to perform a reading activity, the semiconductor region and the first bit line are coupled to a middle voltage and the first word common-source line is coupled to a low voltage, wherein the middle voltage is greater than the low voltage.

17. The multi-write read-only memory array according to claim 11, wherein when the first memory cell is not selected to perform a reading activity, the semiconductor region, the first bit line, and the first word common-source line are coupled to a middle voltage, wherein the middle voltage is greater than the grounding voltage.

18. The multi-write read-only memory array according to claim 3, wherein the semiconductor region is a semiconductor substrate or an epitaxial layer formed on a semiconductor substrate.

* * * * *